United States Patent
Morrison et al.

(10) Patent No.: US 9,211,590 B2
(45) Date of Patent: Dec. 15, 2015

(54) SCREW HEAD WEDGE CLAMP ASSEMBLY FOR CUTTING TOOL

(71) Applicant: Kennametal Inc., Latrobe, PA (US)

(72) Inventors: Lewis Ray Morrison, Latrobe, PA (US); Ravishankar Iyer, North Huntingdon, PA (US)

(73) Assignee: KENNAMETAL INC., Latrobe, PA (US)

(*) Notice: Subject to any disclaimer, the term of this patent is extended or adjusted under 35 U.S.C. 154(b) by 239 days.

(21) Appl. No.: 14/032,240

(22) Filed: Sep. 20, 2013

(65) Prior Publication Data

US 2015/0086284 A1 Mar. 26, 2015

(51) Int. Cl.
- *B23C 5/22* (2006.01)
- *B23B 27/16* (2006.01)
- *B23C 5/06* (2006.01)
- *B23C 5/24* (2006.01)

(52) U.S. Cl.
CPC ............ *B23B 27/1662* (2013.01); *B23C 5/06* (2013.01); *B23C 5/2208* (2013.01); *B23B 2205/04* (2013.01); *B23B 2260/03* (2013.01); *B23B 2260/146* (2013.01); *B23C 2210/165* (2013.01); *Y10T 407/2284* (2015.01)

(58) Field of Classification Search
CPC B23B 27/1677; B23C 5/2437; B23C 5/2441; B23C 5/2472
See application file for complete search history.

(56) References Cited

U.S. PATENT DOCUMENTS

| | | | |
|---|---|---|---|
| 3,056,186 A * | 10/1962 | Greenleaf | 407/41 |
| 4,341,493 A | 7/1982 | Erkfritz | |
| 4,462,725 A * | 7/1984 | Satran et al. | 407/92 |
| 4,470,731 A | 9/1984 | Erkfritz | |
| 4,556,345 A | 12/1985 | Philippi | |
| 4,575,287 A * | 3/1986 | Oshnock et al. | 407/41 |
| 4,597,695 A | 7/1986 | Johnson | |
| 4,631,994 A | 12/1986 | Jester et al. | |
| 4,848,977 A | 7/1989 | Kieninger | |

(Continued)

FOREIGN PATENT DOCUMENTS

| | | |
|---|---|---|
| EP | 2614908 A1 | 7/2013 |
| FR | 2894858 A1 | 6/2007 |

(Continued)

OTHER PUBLICATIONS

"Milling Cutters", http://www.prezisstools.com/face-milling-cutters-and-circular-milling-cutters.html.

(Continued)

*Primary Examiner* — Will Fridie, Jr.
(74) *Attorney, Agent, or Firm* — Larry R. Meenan

(57) ABSTRACT

A screw head wedge clamp assembly for a cutting tool includes a clamp screw having a screw head with a frustum-shaped portion, and a screw head wedge clamp having a body and a clamp head extending from the body. The clamp head has a frustum-shaped portion that is received in a mounting screw bore of a cutting insert. The wedge clamp contacts a radiused bottom wall of the clamp bore when the clamp screw is threaded into a threaded bore of an insert pocket, thereby causing the clamp head to exert a downward and rearward force against a mounting screw bore of the cutting insert to securely hold the cutting insert in the insert pocket. The screw head wedge clamp does not contact a top surface of the cutting insert, but only the frustum-shaped portion contacts the mounting screw bore of the cutting insert.

13 Claims, 4 Drawing Sheets

(56) References Cited

U.S. PATENT DOCUMENTS

| | | | |
|---|---|---|---|
| 5,211,516 A * | 5/1993 | Kress et al. | 408/231 |
| 5,816,751 A | 10/1998 | Frecska | |
| 6,523,768 B2 * | 2/2003 | Recker et al. | 241/294 |
| 6,733,212 B2 | 5/2004 | Nagaya et al. | |
| D523,040 S | 6/2006 | Niebauer et al. | |
| 7,086,812 B2 | 8/2006 | Gamble et al. | |
| 7,131,794 B2 | 11/2006 | Robinson et al. | |
| 7,367,753 B2 | 5/2008 | Maurer | |
| 7,390,150 B2 * | 6/2008 | Kocherovsky et al. | 407/40 |
| 7,513,717 B2 | 4/2009 | Engström et al. | |
| 7,976,250 B2 | 7/2011 | Fang et al. | |
| 7,997,833 B2 * | 8/2011 | Hayashizaki et al. | 407/42 |
| 8,057,131 B2 * | 11/2011 | Conway et al. | 407/103 |
| 8,282,320 B2 | 10/2012 | Hartlohner et al. | |
| 8,337,123 B2 | 12/2012 | Ishida | |
| 8,434,974 B2 | 5/2013 | Spitzenberger | |
| 8,454,278 B2 | 6/2013 | Hartlohner et al. | |
| D710,409 S | 8/2014 | Morrison et al. | |
| D713,433 S | 9/2014 | Morrison et al. | |
| 2009/0285646 A1 | 11/2009 | Oprasic et al. | |
| 2010/0129167 A1 | 5/2010 | Morrison | |
| 2010/0150671 A1 | 6/2010 | Oprasic et al. | |
| 2012/0051852 A1 | 3/2012 | Choi et al. | |
| 2012/0051855 A1 | 3/2012 | Löf | |
| 2013/0195567 A1 | 8/2013 | Sunnvius et al. | |

FOREIGN PATENT DOCUMENTS

| | | |
|---|---|---|
| GB | 1164322 | 9/1969 |
| JP | 2004209615 A | 7/2004 |

OTHER PUBLICATIONS

"Tungmill", http://www.imc-companies.com/Tungaloy/tcat/familyhdr.asp?fnum=44&app=802&mapp=IT&GFSTYP=M&lang=EN&type=1.

* cited by examiner

SCREW HEAD WEDGE CLAMP ASSEMBLY FOR CUTTING TOOL

BACKGROUND OF THE INVENTION

1. Field of the Invention

The invention pertains to the field of tool holders. More particularly, the invention pertains to a screw head wedge clamp assembly for a cutting tool, such as milling cutter, and the like.

2. Description of Related Art

Cutting inserts and tool holder assemblies are known in the art. Generally speaking, a number of types of inserts are commonly detachably clamped to a holder. Preferably, the inserts are securely and accurately held in place by an clamp screw during operation.

However, unique insert pocket designs will not allow machining of the clamp screw hole perpendicular with respect to the floor of the pocket. Therefore, there is a need for a clamping mechanism design that holds the cutting insert securely in place, particular in unique insert pocket designs.

SUMMARY OF THE INVENTION

The problem of holding the cutting insert securely in the insert pocket, particularly in tight or close insert pockets, is solved by designing a screw head wedge clamp mechanism that uses a blank same size clamp screw head to fit into a center hole in the top of the cutting insert. The unique design of the insert pocket holds both the cutting insert and the housing of the wedge with the bottom of the housing radius. In addition, the tapered angle of the screw head pulls in the cutting insert to lock in place into the insert pocket in three locations: the floor and two side walls. Further, the location of the clamp screw hole tightens the wedge down into a slot of the insert pocket with the radius at the bottom causing the wedge to further clamp down on the cutting insert.

In one aspect of the invention, a screw head wedge clamp assembly for a cutting tool comprises a clamp screw having a screw head at one end and a threaded body at an opposite end. The screw head has a frustum-shaped portion that is formed at an angle with respect to a central, longitudinal axis of the screw head. The clamp screw is capable of being threaded into a threaded bore of an insert pocket of a cutting tool. A screw head wedge clamp has a body, a clamp head extending from the body, and a surface for accommodating the clamp screw. The clamp head has a frustum-shaped portion that is formed at an angle with respect to a central, longitudinal axis of the clamp head. The body of the wedge clamp is capable of being received in a clamp bore of the insert pocket of the cutting tool. The clamp head is capable of being at least partially received in a mounting screw bore of the cutting insert 50 in such a way that the screw head wedge clamp does not contact a top surface of the cutting insert, but only the frustum-shaped portion contacts the mounting screw bore of the cutting insert.

In another aspect of the invention, a screw head wedge clamp assembly for a cutting tool comprises a clamp screw having a screw head at one end and a threaded body at an opposite end. The screw head has a frustum-shaped portion that is formed at an angle with respect to a central, longitudinal axis of the screw head. The clamp screw is capable of being threaded into a threaded bore of an insert pocket of a cutting tool. A screw head wedge clamp has a body, a clamp head extending from the body, and a surface for accommodating the clamp screw. The clamp head has a frustum-shaped portion that is formed at an angle with respect to a central, longitudinal axis of the clamp head. The body of the wedge clamp is capable of being received in a clamp bore of the insert pocket of the cutting tool. The screw head contacts both a wall of the insert pocket and the wedge clamp when the clamp screw is threaded into the threaded bore of the insert pocket.

In another aspect of the invention, a screw head wedge clamp assembly for a cutting tool comprises a clamp screw having a screw head at one end and a threaded body at an opposite end. The screw head has a frustum-shaped portion that is formed at an angle with respect to a central, longitudinal axis of the screw head. The clamp screw is capable of being threaded into a threaded bore of an insert pocket of a cutting tool. A screw head wedge clamp has a body, a clamp head extending from the body, and a surface for accommodating the clamp screw. The clamp head has a frustum-shaped portion that is formed at an angle with respect to a central, longitudinal axis of the clamp head. The body of the wedge clamp contacts a bottom wall of the clamp bore when the clamp screw is threaded into the threaded bore of the insert pocket, wherein the bottom wall has a radius, R, thereby causing the clamp head to exert a downward and rearward force against the cutting insert and securely hold the cutting insert in the insert pocket.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
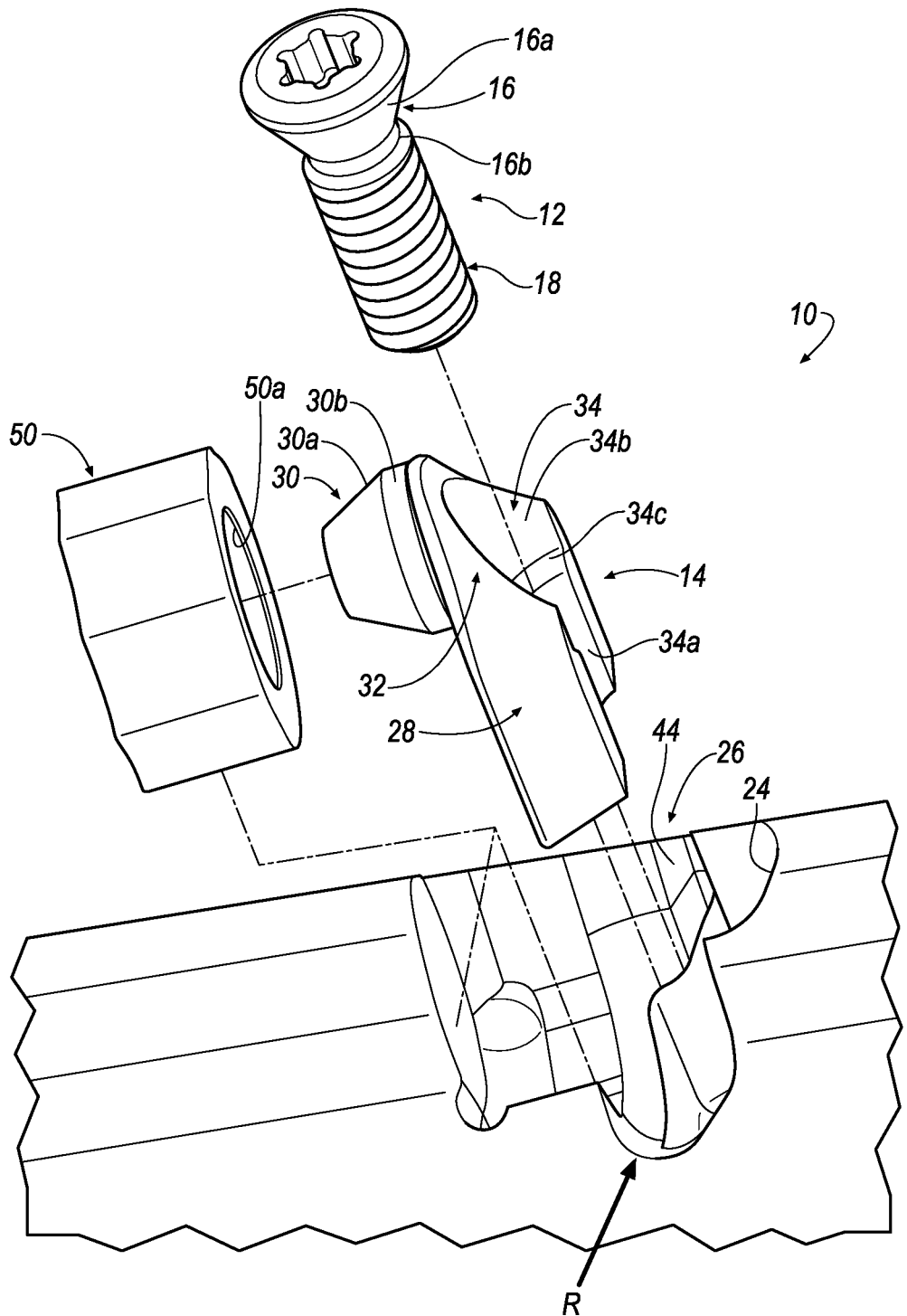
FIG. 1 is an isometric exploded partial view of a screw head wedge clamp assembly in accordance with an embodiment of the invention.
Figure 2:
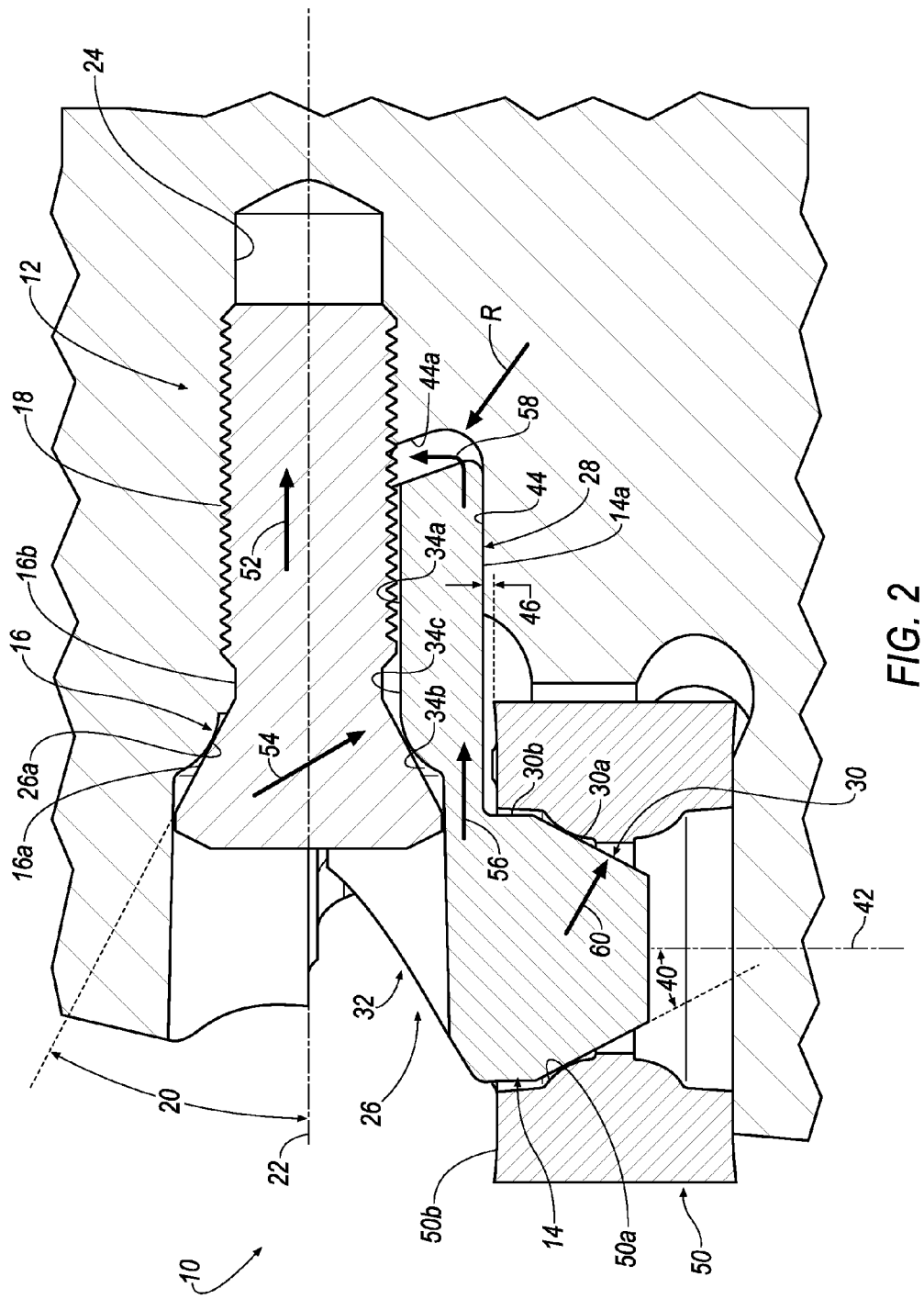
FIG. 2 is a cross-sectional view of the assembly of FIG. 1 positively securing a cutting insert in an insert pocket of a cutting tool.

Referring now to FIGS. 1 and 2, a screw head wedge clamp assembly 10 for a cutting tool, such as a milling cutter, and the like, is shown according to an embodiment of the invention. In general, the assembly 10 includes an clamp screw 12 and a screw head wedge clamp 14.

The clamp screw 12 includes a screw head 16 at one end and a threaded body 18 at the other end. The screw head 16 has a frustum-shaped portion 16a that is formed at an angle 20 with respect to a central, longitudinal axis 22 of the screw head 16. The screw head 16 may also includes a cylindrical-shaped portion 16b between the frustum-shaped portion 16a and the threaded body 18. The cylindrical-shaped portion 16b may have a smaller diameter than the threaded body 18, as shown in FIG. 2. The clamp screw 12 is capable of being threaded into a threaded bore 24 of an insert pocket 26 of the cutting tool.

The screw head wedge clamp 14 is generally L-shaped in side elevation and includes a body 28, a clamp head 30 extending perpendicularly from the body 28, and a tapered forward end 32 between the body 28 and the clamp head 30 for providing a low profile design. A portion of a surface 34 of the wedge clamp 14 has a shape that is complementary to the shape of the clamp screw 12. Specifically, the surface 34 has a first portion 34a with a constant diameter, D1, that is approximately equal to or slightly larger than the diameter of the threaded body 18 of the clamp screw 12 so that the threaded body 18 of the clamp screw 12 can at least partially reside in the body 28 of the clamp 14, as shown in FIG. 2. In addition, the surface 34 has a second portion 34b with a varying diameter, D2, approximately equal to or slightly larger than the varying diameter of the screw head 16 so that the screw head 16 of the clamp screw 12 can at least partially reside in the tapered forward end 32 of the clamp 14, as shown in FIG. 2. Further, the surface 34 includes an intermediate portion 34c that is disposed between the first portion 34a from the second portion 34b for accommodating the cylindrical-shaped portion 16b between the screw head 16a and the threaded body 18 of the screw 12.

Although the surface 34 of the wedge clamp 14 is the form of a groove in the illustrated embodiment, it will be appreciated that the principles of the invention can be practiced with other designs for the surface 34 of the wedge clamp 14. For example, in an alternate embodiment, the surface 34 of the wedge clamp 14 is in the form of an aperture for accommodating the clamp screw 12 when inserted through the aperture.

Figure 3:
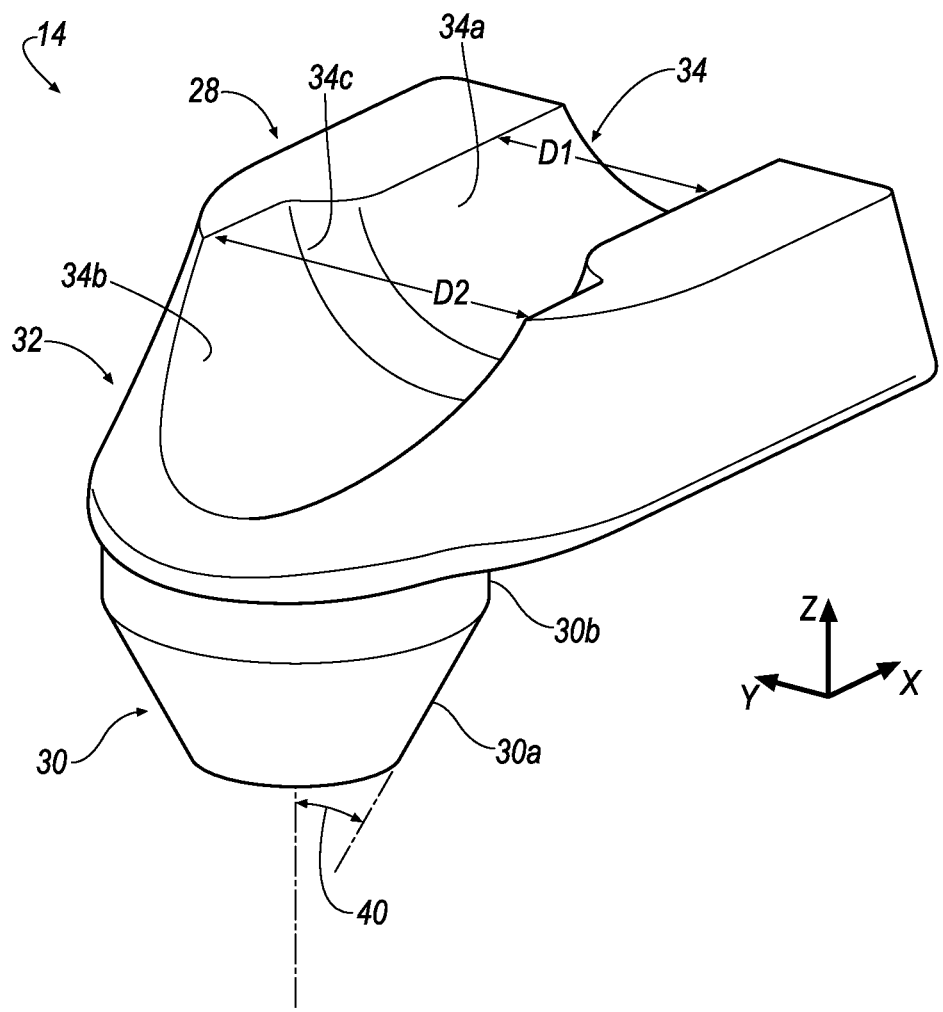
FIG. 3 is an isometric view of the wedge clamp according to an embodiment of the invention.

As shown in FIGS. 2 and 3, the clamp head 30 has a frustum-shaped portion 30a that is formed at an angle 40 with respect to a central, longitudinal axis 42 of the clamp head 30. The angle 40 is approximately equal to the angle 20 so that the clamp screw 12 can be used to secure a cutting insert 50 in the insert pocket 26 instead of the clamp 14, if desired. It is noted the axis 42 of the clamp head 30 is substantially perpendicular to the axis 22 of the clamp screw 12. The clamp head 30 may also include a cylindrical-shaped portion 30b between the frustum-shaped portion 30a and the tapered end portion 32. The screw head wedge clamp 14 is capable of being at least partially received in a clamp bore 44 of the insert pocket 26 in such a way that only a bottom surface 14a of the clamp 14 contacts the clamp bore 44 of the insert pocket 26, as shown in FIG. 2. In addition, the clamp head 30 is capable of being at least partially received in a mounting screw bore 50a of the cutting insert 50 in such a way that the screw head wedge clamp 14 does not contact a top surface 50b of the cutting insert 50, but only the frustum-shaped portion 30a contacts the mounting screw bore 50a of the cutting insert 50, as shown in FIG. 2.

In operation, the screw head 16 and the threaded body 18 of the clamp screw 12 is at least partially received in the groove 34 of the clamp 14, and the clamp head 30 of the clamp 14 is inserted into the mounting screw bore 50a of the cutting insert 50, as shown in FIG. 2. As the clamp screw 12 is threaded into the bore 24, the contact between the frustum-shaped portion 16a of the screw head 16 and the second portion 34b of the wedge clamp 14 causes the clamp screw 12 and the wedge clamp 14 to move from left to right, as indicated by the arrows 52 and 56. As the clamp screw 16 is further threaded into the bore 24, the frustum-shaped portion 16a of the screw head 16 eventually contacts a wall 26a of the insert pocket opposite the wedge clamp 14, which causes the clamp screw 12 to move downward and to the right, as indicated by the arrow 54. At the same time, the wedge clamp 14 engages a radius, R, formed in a bottom wall 44a of the clamp bore 44. The radius, R, in the bottom wall 44a causes one end of the wedge clamp 14 distal to the screw head 30 to move upward, as indicated by the arrow 58. This upward movement of one end of the wedge clamp 16 causes a downward movement of the clamp head 30 at the opposite end of the wedge clamp 16, thereby causing the clamp head 30 to exert a downward and rearward force against the mounting screw bore 50a of the cutting insert 50, as indicated by the arrow 60, and securely hold the cutting insert 50 in the insert pocket 26. It is noted that a gap 46 exists between the bottom 14a of the wedge clamp 14 and the cutting insert 50, so the screw head wedge clamp 14 does not contact a top surface 50b of the cutting insert 50, but only the frustum-shaped portion 30a of the clamp head 30 contacts the cutting insert 50 when the cutting insert 50 is positively secured in the insert pocket 26 by the assembly 10.

Figure 4:
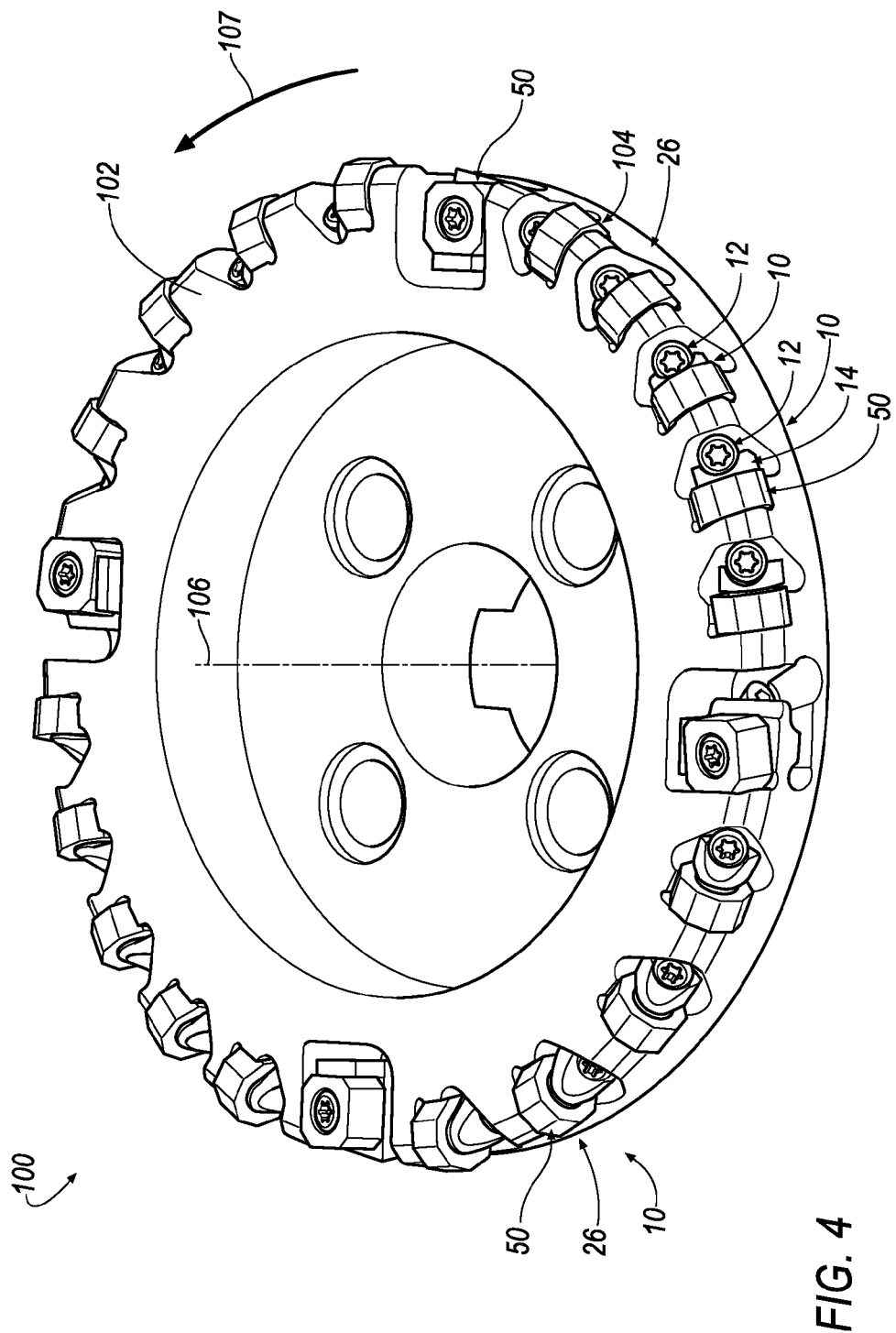
FIG. 4 is an isometric bottom view of a cutting tool, such as a milling cutter, with the screw head wedge clamp assembly of FIG. 1 according to an embodiment of the invention.

Referring now to FIG. 4, a cutting tool 100, such as a milling cutter, with a close insert pocket design is shown according to an embodiment of the invention. The milling cutter 100 comprises a tool body 102 with a plurality of circumferentially-spaced insert pockets 104. The tool body 102 is designed to be rotatably driven about a central longitudinal axis 106 in a direction 107. In the illustrated embodiment, the milling cutter 100 includes a total of twenty (20) insert pockets that are isometrically mounted in the insert pocket 26. However, it will be appreciated that the invention is not limited by the number of insert pockets, and that the invention can be practiced with any desirable number of pockets that provide the desired cutting capabilities.

As described above, an assembly 10 comprising a wedge clamp 14 and a clamp screw 12 provides a simple mechanism for effectively and positively securing the cutting insert 50 in the insert pocket 26 of the cutting tool. Specifically, the screw head 16 of the clamp screw 12 engages the wedge clamp 16 and causes movement of wedge clamp 16 until the wedge clamp engages the radius, R, formed in the bottom wall 44a of the clamp bore 44. As the clamp screw 12 is further threaded into the bore 24, the upward movement of one end of the wedge clamp 14 causes a downward and rearward movement of the clamp head 30 against the mounting screw bore 50a of the cutting insert 50 to positively secure the cutting insert 50 in the insert pocket 26. Because the clamp head 30 of the wedge clamp 16 has the same shape as the screw head 16 of the clamp screw 12, there is no need to modify the mounting screw bore 50a of the cutting insert 50 in order to use the clamp screw 12 to positively secure the cutting insert 50 in the insert pocket 26, rather than the wedge clamp 14, so long as space is available in the insert pocket 26 for the use of the clamp screw 12.

The patents and publications referred to herein are hereby incorporated by reference.

Having described presently preferred embodiments the invention may be otherwise embodied within the scope of the appended claims.

What is claimed is:

1. A screw head wedge clamp assembly for a cutting tool, comprising:
    a clamp screw having a screw head at one end and a threaded body at an opposite end, the screw head having a frustum-shaped portion that is formed at an angle with respect to a central, longitudinal axis of the screw head, the clamp screw capable of being threaded into a threaded bore of an insert pocket of a cutting tool; and
    a screw head wedge clamp having a body, a clamp head extending from the body and a surface for accommodating the clamp screw, the clamp head having a frustum-shaped portion that is formed at an angle with respect to a central, longitudinal axis of the clamp head, the body of the wedge clamp is capable of being received in a clamp bore of the insert pocket of the cutting tool,
    wherein the central, longitudinal axis of the screw head is substantially perpendicular to the central, longitudinal axis of the clamp head.

2. The assembly according to claim 1, wherein the clamp head is capable of being at least partially received in a mounting screw bore of the cutting insert in such a way that the screw head wedge clamp does not contact a top surface of the cutting insert, but only the frustum-shaped portion contacts the mounting screw bore of the cutting insert.

3. The assembly according to claim 1, wherein the angle formed by the frustum-shaped portion of the clamp head is equal to the angle formed by the frustum-shaped portion of the screw head.

4. The assembly according to claim 1, wherein the screw head contacts both a wall of the insert pocket and the wedge clamp when the clamp screw is threaded into the threaded bore of the insert pocket.

5. The assembly according to claim 1, wherein the body of the wedge clamp contacts a bottom wall of the clamp bore when the clamp screw is threaded into the threaded bore of the insert pocket, and wherein the bottom wall has a radius, R, thereby causing the clamp head to exert a downward and rearward force against the cutting insert and securely hold the cutting insert in the insert pocket without contacting the top surface of the cutting insert.

6. A screw head wedge clamp assembly for a cutting tool, comprising:
   a clamp screw having a screw head at one end and a threaded body at an opposite end, the screw head having a frustum-shaped portion that is formed at an angle with respect to a central, longitudinal axis of the screw head, the clamp screw capable of being threaded into a threaded bore of an insert pocket of a cutting tool; and
   a screw head wedge clamp having a body, a clamp head extending from the body and a surface for accommodating the clamp screw, the clamp head having a frustum-shaped portion that is formed at an angle with respect to a central, longitudinal axis of the clamp head, the body of the wedge clamp is capable of being received in a clamp bore of the insert pocket of the cutting tool,
   wherein the central, longitudinal axis of the screw head is substantially perpendicular to the central, longitudinal axis of the clamp head, and
   wherein the screw head contacts both a wall of the insert pocket and the wedge clamp when the clamp screw is threaded into the threaded bore of the insert pocket.

7. The assembly according to claim 6, wherein the angle formed by the frustum-shaped portion of the clamp head is equal to the angle formed by the frustum-shaped portion of the screw head.

8. The assembly according to claim 6, wherein the body of the wedge clamp contacts a bottom wall of the clamp bore when the clamp screw is threaded into the threaded bore of the insert pocket, and wherein the bottom wall has a radius, R, thereby causing the clamp head to exert a downward and rearward force against the cutting insert and securely hold the cutting insert in the insert pocket.

9. The assembly according to claim 6, wherein the clamp head is capable of being at least partially received in a mounting screw bore of the cutting insert in such a way that only the frustum-shaped portion of the clamp head contacts the mounting screw bore of the cutting insert.

10. A screw head wedge clamp assembly for a cutting tool, comprising:
    a clamp screw having a screw head at one end and a threaded body at an opposite end, the screw head having a frustum-shaped portion that is formed at an angle with respect to a central, longitudinal axis of the screw head, the clamp screw capable of being threaded into a threaded bore of an insert pocket of a cutting tool; and
    a screw head wedge clamp having a body, a clamp head extending from the body and a surface for accommodating the clamp screw, the clamp head having a frustum-shaped portion that is formed at an angle with respect to a central, longitudinal axis of the clamp head, the body of the wedge clamp is capable of being received in a clamp bore of the insert pocket of the cutting tool,
    wherein the central, longitudinal axis of the screw head is substantially perpendicular to the central, longitudinal axis of the clamp head, and
    wherein the body of the wedge clamp contacts a bottom wall of the clamp bore when the clamp screw is threaded into the threaded bore of the insert pocket, and wherein the bottom wall has a radius, R, thereby causing the clamp head to exert a downward and rearward force against the cutting insert and securely hold the cutting insert in the insert pocket.

11. The assembly according to claim 10, wherein the clamp head is capable of being at least partially received in a mounting screw bore of the cutting insert in such a way that only the frustum-shaped portion of the clamp head contacts the mounting screw bore of the cutting insert.

12. The assembly according to claim 10, wherein the angle formed by the frustum-shaped portion of the clamp head is equal to the angle formed by the frustum-shaped portion of the screw head.

13. The assembly according to claim 10, wherein the screw head contacts both a wall of the insert pocket and the wedge clamp when the clamp screw is threaded into the threaded bore of the insert pocket.

* * * * *